United States Patent
Hasty et al.

(10) Patent No.: US 10,963,205 B2
(45) Date of Patent: Mar. 30, 2021

(54) AUGMENTED REALITY STATE ROOM

(71) Applicant: Royal Caribbean Cruises Ltd., Miami, FL (US)

(72) Inventors: Joey Hasty, Miami, FL (US); David Smith, Orlando, FL (US); Josh Nakaya, Glendale, CA (US)

(73) Assignee: Royal Caribbean Cruises Ltd., Miami, FL (US)

( * ) Notice: Subject to any disclaimer, the term of this patent is extended or adjusted under 35 U.S.C. 154(b) by 0 days.

(21) Appl. No.: 16/177,384

(22) Filed: Oct. 31, 2018

(65) Prior Publication Data

US 2020/0133613 A1 Apr. 30, 2020

(51) Int. Cl.

| G06T 13/00 | (2011.01) |
|---|---|
| G06F 3/14 | (2006.01) |
| G06T 13/60 | (2011.01) |
| G09G 3/32 | (2016.01) |

(52) U.S. Cl.
CPC .......... *G06F 3/1446* (2013.01); *G06T 13/60* (2013.01); *G09G 3/32* (2013.01); *G09G 2354/00* (2013.01)

(58) Field of Classification Search
CPC ......... G06T 13/40; G06T 13/00; G06T 13/80; G06T 13/20; A63F 13/10
USPC ........................................... 345/473
See application file for complete search history.

(56) References Cited

U.S. PATENT DOCUMENTS

| 10,062,205 | B2* | 8/2018 | Eikhoff | G06F 16/5854 |
|---|---|---|---|---|
| 2010/0209007 | A1* | 8/2010 | Elyada | G06T 7/97 |
| | | | | 382/218 |
| 2012/0237904 | A1* | 9/2012 | Alicea | G09B 19/0023 |
| | | | | 434/128 |
| 2014/0146024 | A1* | 5/2014 | Kamada | G09G 3/20 |
| | | | | 345/204 |
| 2019/0005716 | A1* | 1/2019 | Singh | H04L 67/38 |
| 2019/0019346 | A1* | 1/2019 | Cuthbertson | A63F 13/792 |

\* cited by examiner

*Primary Examiner* — Gordon G Liu
(74) *Attorney, Agent, or Firm* — Steven M. Greenberg, Esq.; Shutts & Bowen LLP

(57) ABSTRACT

A method, system and computer program product for generating augmented reality in a state room includes establishing a communicative link with different computing devices disposed within separate state rooms, with each of the state rooms including a display positioned at a ceiling, a display positioned on a wall and a display embedded in a floor. The method further includes, for each of the state rooms, assigning a theme of an exterior environment, directing the retrieval from fixed storage of exterior environmental imagery, and directing display of an atmospheric portion of the exterior environmental imagery on the display positioned at the ceiling, directing display of a horizon portion of the exterior environmental imagery on the display positioned on the wall, and directing display of a surface portion of the exterior environmental imagery on the display embedded in the floor.

15 Claims, 2 Drawing Sheets

AUGMENTED REALITY STATE ROOM

BACKGROUND OF THE INVENTION

Field of the Invention

The present invention relates to augmented reality and more particularly to the use of augmented reality in a living space.

Description of the Related Art

Virtual reality refers to the computerized display of a computer-generated environment imitating a corresponding real-world physical environment. In virtual reality, the computer-generated environment often provides a first-person viewpoint and is responsive to computer directed movements so that the first-person viewpoint presented in the computerized display changes according to the computer directed movements. Early forms of virtual reality required the end user to input the computer directed movements through a conventional computing system. But, more recent virtual reality systems incorporate human wearable or holdable sensors so that the movements are translated directly from the sensed movements of the human wearable or holdable sensors. Indeed, the most recent renditions of virtual reality rigs include a wearable headset such that the end user only perceives the imagery on a display of the headset without seeing any of the real, physical world. In this way, virtual reality has become an immersive experience.

Augmented reality is a close cousin of virtual reality in that augmented reality more closely bridges actual reality with a fabricated digital reality. In this regard, augmented reality refers to an interactive experience compositing a real-world environment with real-world objects augmented through the use of computer-generated perceptual information. In many instances, this object augmentation traverses multiple sensory modalities, including visual, auditory, haptic, somatosensory, and olfactory. The overlaid sensory information can be constructive meaning that the information adds to a real-world, natural environment, or destructive in so far as the information masks the real world, natural environment. In either circumstance, the augmented real-world objects are seamlessly interwoven with the physical world such that the totality may be perceived as an immersive aspect of the real environment. Consequently, augmented reality alters ongoing perception of a real world environment, whereas virtual reality completely replaces the real world environment with a simulated environment.

BRIEF SUMMARY OF THE INVENTION

Embodiments of the present invention address deficiencies of the art in respect to augmented reality and provide a novel and non-obvious method, system and computer program product for generating augmented reality in a state room. In an embodiment of the invention, a method for generating an augmented reality environment within a state room includes establishing a communicative link with different computing devices disposed within separate state rooms, with each of the state rooms including a display positioned at a ceiling, a display positioned on a wall and a display embedded in a floor. The method further includes, for each of the state rooms, assigning a theme of an exterior environment, directing the retrieval from fixed storage of exterior environmental imagery, and directing display of an atmospheric portion of the exterior environmental imagery on the display positioned at the ceiling, directing display of a horizon portion of the exterior environmental imagery on the display positioned on the wall, and directing display of a surface portion of the exterior environmental imagery on the display embedded in the floor.

In one aspect of the embodiment, the method further includes detecting a stepping upon the display embedded in the flow by animating the surface portion of the surface portion on the display embedded in the floor. In another aspect of the embodiment, each of the displays is an arrangement of light emitting diode (LED) displays. In yet another embodiment of the invention, the atmospheric portion of the exterior environmental imagery is imagery of sky, the horizon portion of the exterior environmental imagery is a horizon below the sky, and the surface portion of the exterior environmental imagery is water. Finally, in even yet another aspect of the embodiment, the animating is a presentation of ripples in water on the display embedded in the floor.

In another embodiment of the invention, a data processing system for generating an augmented reality environment within a state room includes a host computing system that includes one or more computers, each with memory and at least one processor, communicatively linked with different computing devices disposed within separate state rooms, with each of the state rooms including a display positioned at a ceiling, a display positioned on a wall and a display embedded in a floor. The system further includes an augmented reality generation module executing in the memory of the host computing system. The module includes program instructions enabled to perform for each of the state rooms, assigning a theme of an exterior environment, directing the retrieval from fixed storage of exterior environmental imagery, and directing display of an atmospheric portion of the exterior environmental imagery on the display positioned at the ceiling, directing display of a horizon portion of the exterior environmental imagery on the display positioned on the wall, and directing display of a surface portion of the exterior environmental imagery on the display embedded in the floor.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for an augmented reality state room data processing system. In accordance with an embodiment of the invention, an augmented reality state room data processing system includes a host computing system with one or more computers communicatively linked to different client computing devices associated with respectively different state rooms. Each of the state rooms includes a collection of display panels disposed at least on a floor ceiling and wall of an associated one of the state rooms. An augmentation reality module executes in the memory of the host computing system and manages different exterior environmental themes assigned to different ones of the state rooms in so far as for a given one of the themes for a corresponding one of the state rooms, the module directs display panels in a corresponding one of the state rooms to display a coordinated set of exterior environmental imagery consistent with the given one of the themes. Importantly, the coordinated set of imagery includes a disposition of exterior atmospheric imagery positioned at one of the panels positioned at a ceiling of the corresponding one of the state rooms, a disposition of exterior environmental horizon imagery at one of the panels positioned at a wall of the corresponding one of the state rooms, and a disposition of exterior environmental surface imagery at one of the panels positioned at a floor of the corresponding one of the state rooms. In this way, one present in the corresponding one of the state rooms will experience an augmented reality of the state room with a visualization of a exterior environmental condition of the given one of the themes.

Figure 1:
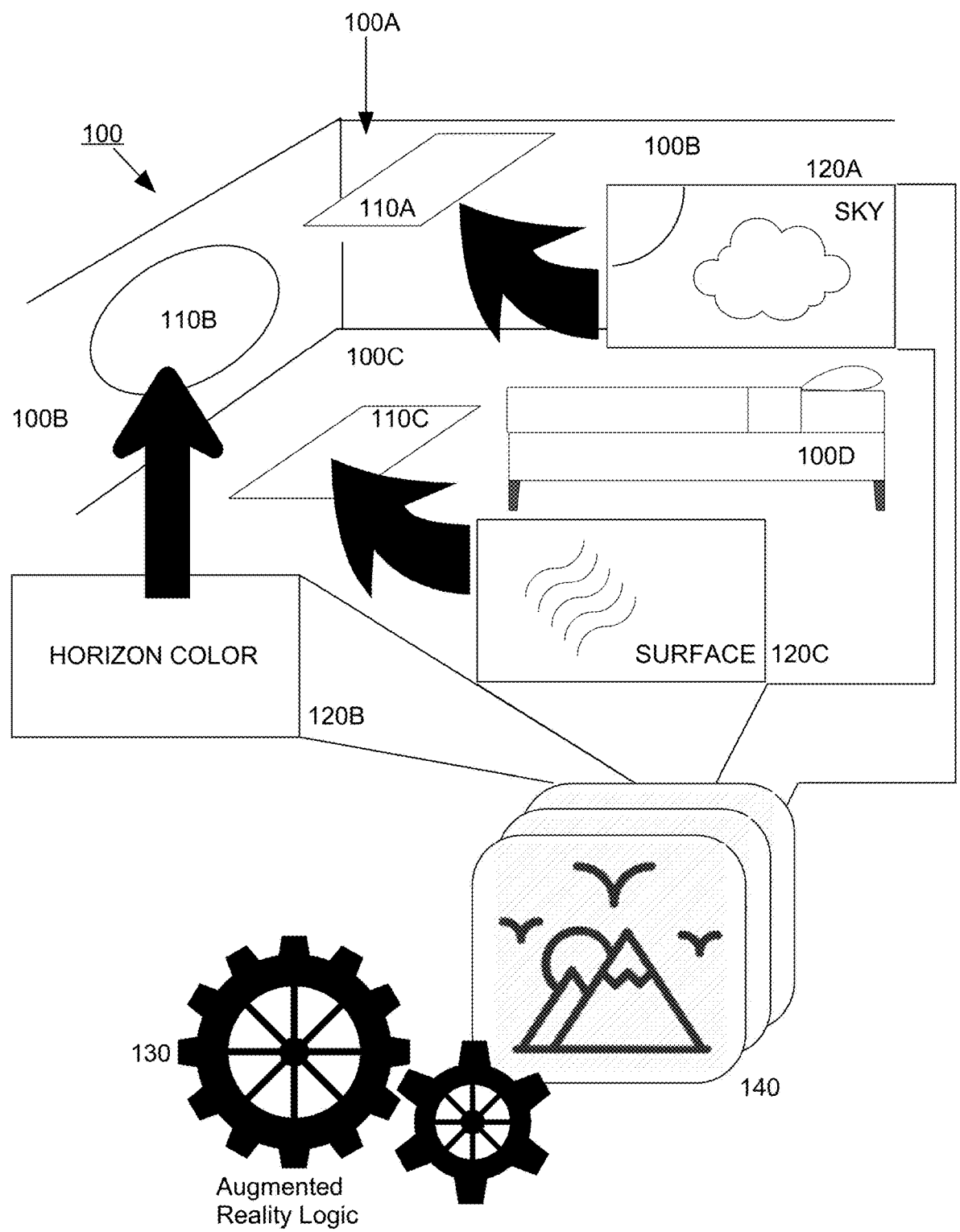
FIG. 1 is pictorial illustration of a process for generating an augmented reality environment within a state room.

In further illustration, FIG. 1 pictorially shows a process for generating an augmented reality environment within a state room. As shown in FIG. 1, a state room 100 such as that found on a cruise ship includes multiple different walls 100B established between a ceiling 100A and a floor 100C and includes therein furniture 100D such as a bed. At least one flat panel display 110A, such as an LED display, is positioned on the ceiling 100A, at least one flat panel display 110B is positioned on one of the walls 100B, and at least one flat panel display 110C is embedded in the floor 100C. Each flat panel display 110A, 110B, 110C may include one or more actual display panels arranged together with imagery presented therein in a coordinated manner.

Notably, augmented reality logic 130 managed multiple different images 140 each of a corresponding exterior environmental theme such as a mountain vista, a river scene or beach scene. It is to be appreciated that each of the different images 140 may be a film clip formed of many different static images such as a short movie. For each different state room 100 in the cruise ship, one of the images 140 is selected in response to which the selected one of the images 140 is partitioned into an atmospheric portion 120A, a horizon portion 120B and a surface portion 120C. More specifically, the portion of the selected one of the images 140 corresponding to a view of the atmosphere above the horizon—namely the sky and all objects contained therein—is the atmospheric portion 120A, the portion of the selected one of the images 140 corresponding to a view of below the horizon—namely the planetary surface—is the surface portion 120C and the imagery therebetween is the horizon portion 120B. Optionally, the horizon portion 120 may include a simple color or color scheme consistent with the coloring of the atmospheric portion 120A or the surface portion 120C.

Once the selected one of the images 140 has been partitioned into the atmospheric portion 120A, the horizon portion 120B and the surface portion 120C, the augmented reality logic 130 directs the flat panel display 110A positioned on the ceiling 100A to display therein the atmospheric portion 120A, the augmented reality logic 130 directs the flat panel display 110B positioned in the wall 100B to display therein the horizon portion 120B, and the augmented reality logic 130 directs the flat panel display 110C embedded in the floor 100C to display therein the surface portion 120C. Optionally, upon sensing pressure upon flat panel display 110C embedded in the floor 100C, the augmented reality logic 130 may direct an animation of the surface portion 120C so as to simulate the movement of the surface represented by the surface portion 120C such as the rippling of water or vibration of earth.

Figure 2:
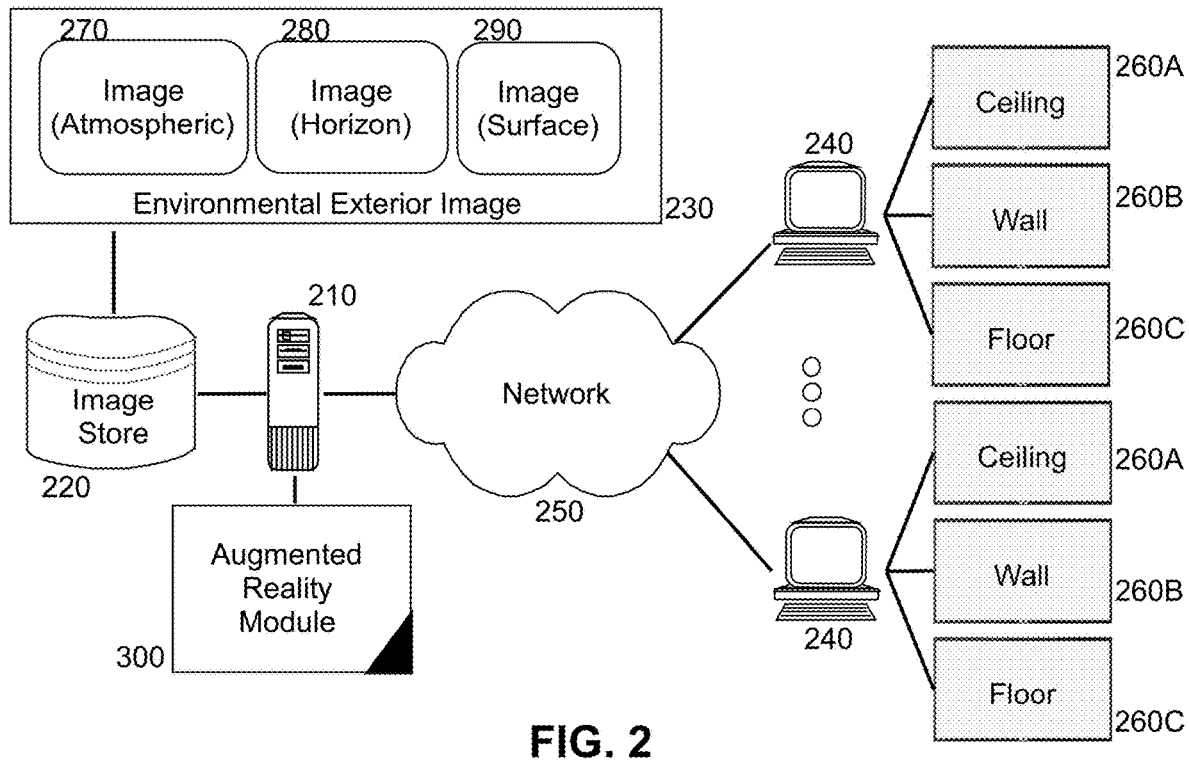
FIG. 2 is a schematic illustration of a computer data processing system configured for managing different augmented reality environments within respectively different state rooms of a cruise ship; and, FIG. 3 is a flow chart illustrating a process for managing different augmented reality environments within respectively different state rooms of a cruise ship.

The process described in connection with FIG. 1 may be implemented in a data processing system. In yet further illustration, FIG. 2 schematically shows a computer data processing system configured for managing different augmented reality environments within respectively different state rooms of a cruise ship. The system includes a host computing system 210 that includes one or more computers, each with memory and at least one processor. The host computing system 210 is communicatively coupled over computer communications network 250 to different client computers 240 each associated with one or more state rooms of a cruise ship. Each one of the client computers 240, in turn, is communicatively linked to at least one set of flat panel displays 260A, 260B, 260C in an associated one of the state rooms. Finally, the host computing system 210 is coupled to an image store 220 that includes a multiplicity of images 230, whether static or dynamic such as a movie or video clip. Each of the images 230 includes an atmospheric portion 270, a horizon portion 280 and a surface portion 290.

Notably, the system includes an augmented reality module 300. The augmented reality module 300 includes computer program instructions that when executing in the memory of the host computing system 210 are enabled to select for different ones of the state rooms of the cruise ship, a corresponding one of the images 230. The computer program instructions further are enabled to direct, for each one of the different ones of the state rooms, a corresponding one of the client computers 240 to display a selected one of the images 230 within those of the flat panel displays 260A, 260B, 260C positioned with the one of the different ones of the state rooms. Specifically, the program instructions direct the corresponding one of the client computers 240 to display the atmospheric portion 270 of the selected one of the images 230 in the flat panel display 260A positioned on the ceiling of the one of the different ones of the state rooms, the horizon portion 280 in the flat panel display 260B positioned on the wall of the one of the different ones of the state rooms, and the surface portion 290 in the flat panel display 260C embedded in the floor of the one of the different ones of the state rooms.

Figure 3:
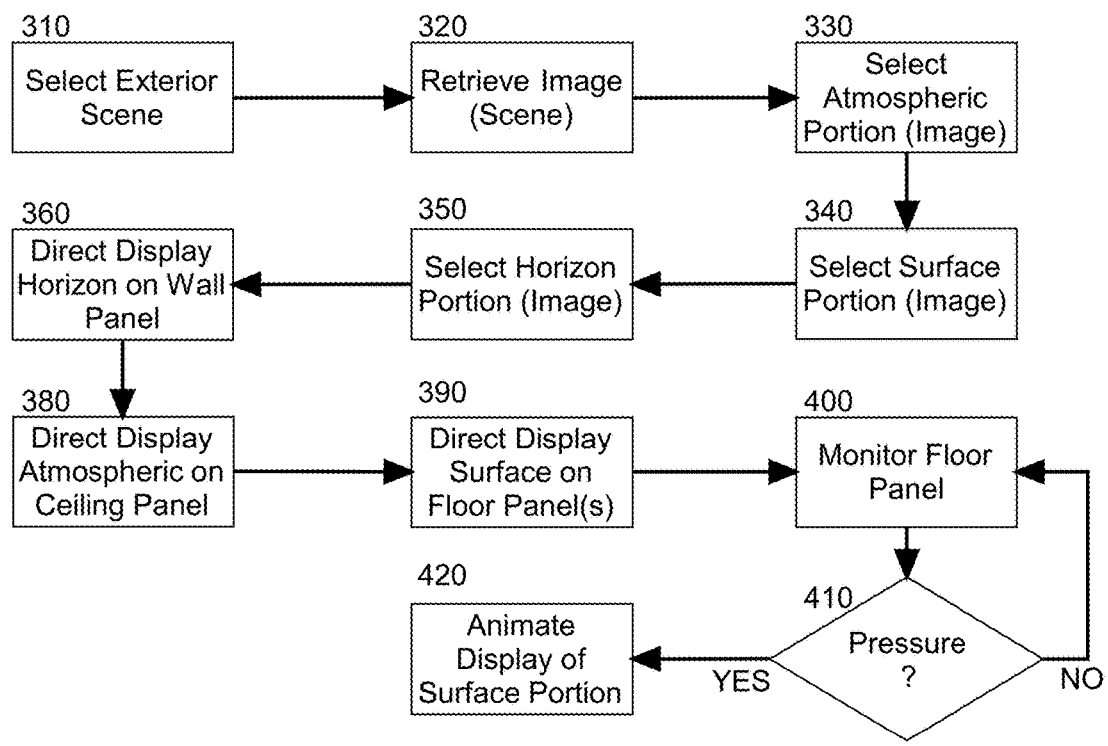

In yet further illustration of the operation of the augmented reality module, FIG. 3 is a flow chart illustrating a process for managing different augmented reality environments within respectively different state rooms of a cruise ship. Beginning in block 310, an exterior scene is selected for a corresponding state room of the cruise ship. In block 320, an image is retrieved in association with the selected exterior scene. In block 330, an atmospheric portion is determined for the image, in block 340 a horizon portion is determined for the image, and in block 350 a surface portion is determined for the image. Then, in block 360 the panel display affixed to the wall of the state room is directed to display the horizon portion. As well, in block 380 the panel display affixed to the ceiling is directed to display the atmospheric portion. Finally, in block 390 the panel embedded in the floor is directed to display the surface portion.

Thereafter, in block 400 the panel display embedded in the floor is monitored to detect pressure such as the threshold pressure experienced when a person steps onto the flat panel display embedded in the floor. In decision block 410, if a threshold pressure is detected in the flat panel display embedded in the floor, the surface portion displayed in the flat panel display is animated in block 420 so as to simulate the movement of surface imagery such as the rippling of water or vibration of earth. To achieve such an effect, a separate film clip of the movement of water or vibration of earth may be displayed in the flat panel display embedded in the floor.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for generating an augmented reality environment within a state room comprising:
   establishing a communicative link with different computing devices disposed within separate state rooms, each of the state rooms comprising a display positioned at a ceiling, a display positioned on a wall and a display embedded in a floor; and, for each of the state rooms:
assigning a theme of an exterior environment,
directing the retrieval from fixed storage of exterior environmental imagery, the imagery comprising three portions: an atmospheric portion depicting an atmosphere of the imagery, a horizon portion depicting scenery of a horizon of the imagery, and a surface portion depicting a planetary surface of the imagery,
determining for the imagery, the atmospheric portion, determining for the imagery the horizon portion, and determining for the image the surface portion,
directing display of the atmospheric portion of the exterior environmental imagery on the display positioned at the ceiling, directing display of the horizon portion of the exterior environmental imagery on the display positioned on the wall, and directing display of the surface portion of the exterior environmental imagery on the display embedded in the floor; and,
detecting a stepping upon the display embedded in the floor and responding to the detection by animating the surface portion of the exterior environmental imagery on the display that is embedded in the floor.

2. The method of claim 1, wherein each of the displays is an arrangement of light emitting diode (LED) displays.

3. The method of claim 1, wherein the atmospheric portion of the exterior environmental imagery is imagery of sky, the horizon portion of the exterior environmental imagery is a horizon below the sky, and the surface portion of the exterior environmental imagery is water.

4. The method of claim 1, wherein the atmospheric portion of the exterior environmental imagery is imagery of sky, the horizon portion of the exterior environmental imagery is a horizon below the sky, and the surface portion of the exterior environmental imagery is earthen material.

5. The method of claim 1, wherein the animating is a presentation of ripples in water on the display embedded in the floor.

6. A data processing system for generating an augmented reality environment within a state room, the system comprising:
a host computing system comprising one or more computers, each with memory and at least one processor, communicatively linked with different computing devices disposed within separate state rooms, each of the state rooms comprising a display positioned at a ceiling, a display positioned on a wall and a display embedded in a floor; and,
an augmented reality generation module executing in the memory of the host computing system, the module comprising program instructions enabled to perform for each of the state rooms:
assigning a theme of an exterior environment,
directing the retrieval from fixed storage of exterior environmental imagery, the imagery comprising three portions: an atmospheric portion depicting an atmosphere of the imagery, a horizon portion depicting scenery of a horizon of the imagery, and a surface portion depicting a planetary surface of the imagery,
determining for the imagery, the atmospheric portion, determining for the imagery the horizon portion, and determining for the image the surface portion,
directing display of the atmospheric portion of the exterior environmental imagery on the display positioned at the ceiling, directing display of the horizon portion of the exterior environmental imagery on the display positioned on the wall, and directing display of the surface portion of the exterior environmental imagery on the display embedded in the floor; and,
detecting a stepping upon the display embedded in the floor and responding to the detection by animating the surface portion of the exterior environmental imagery on the display that is embedded in the floor.

7. The system of claim 6, wherein each of the displays is an arrangement of light emitting diode (LED) displays.

8. The system of claim 6, wherein the atmospheric portion of the exterior environmental imagery is imagery of sky, the horizon portion of the exterior environmental imagery is a horizon below the sky, and the surface portion of the exterior environmental imagery is water.

9. The system of claim 6, wherein the atmospheric portion of the exterior environmental imagery is imagery of sky, the horizon portion of the exterior environmental imagery is a horizon below the sky, and the surface portion of the exterior environmental imagery is water.

10. The system of claim 6, wherein the animating is a presentation of ripples in water on the display embedded in the floor.

11. A computer program product for generating an augmented reality environment within a state room, the computer program product including a computer readable storage medium having program instructions embodied therewith, the program instructions executable by a device to cause the device to perform a method including:
establishing a communicative link with different computing devices disposed within separate state rooms, each of the state rooms comprising a display positioned at a ceiling, a display positioned on a wall and a display embedded in a floor; and,
for each of the state rooms:
assigning a theme of an exterior environment,
directing the retrieval from fixed storage of exterior environmental imagery, the imagery comprising three portions: an atmospheric portion depicting an atmosphere of the imagery, a horizon portion depicting scenery of a horizon of the imagery, and a surface portion depicting a planetary surface of the imagery,
determining for the imagery, the atmospheric portion, determining for the imagery the horizon portion, and determining for the image the surface portion,
directing display of the atmospheric portion of the exterior environmental imagery on the display positioned at the ceiling, directing display of the horizon portion of the exterior environmental imagery on the display positioned on the wall, and directing display of the surface portion of the exterior environmental imagery on the display embedded in the floor; and,
detecting a stepping upon the display embedded in the floor and responding to the detection by animating the surface portion of the exterior environmental imagery on the display that is embedded in the floor.

12. The computer program product of claim 11, wherein each of the displays is an arrangement of light emitting diode (LED) displays.

13. The computer program product of claim 11, wherein the atmospheric portion of the exterior environmental imagery is imagery of sky, the horizon portion of the exterior environmental imagery is a horizon below the sky, and the surface portion of the exterior environmental imagery is water.

14. The computer program product of claim 11, wherein the atmospheric portion of the exterior environmental imagery is imagery of sky, the horizon portion of the exterior environmental imagery is a horizon below the sky, and the surface portion of the exterior environmental imagery is water.

15. The computer program product of claim 11, wherein the animating is a presentation of ripples in water on the display embedded in the floor.

* * * * *